(12) United States Patent
Byrnes et al.

(10) Patent No.: US 6,256,609 B1
(45) Date of Patent: *Jul. 3, 2001

(54) METHOD AND APPARATUS FOR SPEAKER RECOGNITION USING LATTICE-LADDER FILTERS

(75) Inventors: Christopher I. Byrnes, Clayton, MO (US); Anders Lindquist, Täby (SE)

(73) Assignee: Washington University, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/117,721

(22) PCT Filed: May 11, 1998

(86) PCT No.: PCT/US98/09576

§ 371 Date: Aug. 5, 1998

§ 102(e) Date: Aug. 5, 1998

(87) PCT Pub. No.: WO98/50908

PCT Pub. Date: Nov. 12, 1998

Related U.S. Application Data

(63) Continuation-in-part of application No. 08/854,150, filed on May 9, 1997, now Pat. No. 5,490,791.

(51) Int. Cl.[7] .................................................. G10L 17/00

(52) U.S. Cl. .............................................. 704/246; 704/219

(58) Field of Search .................................... 704/246, 247, 704/250, 219

(56) References Cited

U.S. PATENT DOCUMENTS

| | | |
|---|---|---|
| 2,151,091 | 3/1939 | Dudley . |
| 2,243,526 | 5/1941 | Dudley . |
| 4,209,836 | 6/1980 | Wiggins, Jr. et al. . |
| 4,775,951 | 10/1988 | Iwahashi et al. . |
| 5,048,088 | 9/1991 | Taguchi . |
| 5,293,448 | 3/1994 | Honda . |
| 5,940,791 | * 8/1999 | Byrnes et al. ................ 704/219 |

OTHER PUBLICATIONS

K.J. Åström, *Introduction to stochastic realization theory*, Academic Press (1970).

K.J. Åström, Evaluation of quadratic loss functions for linear systems, in *Fundamentals of Discrete–time systems*: A tribute to Professor Eliahu I. Jury, M. Jamshidi, M. Mansour, and B.D.O. Anderson (editors), IITSI Press, Albuquerque, New Mexico (1993) pp. 45–56.

T.P. Barnwell III, K. Nayebi and C.H. Richardson, *Speech Coding: A computer Laboratory Textbook*, John Wiley & Sons, New York, (1996).

(List continued on next page.)

Primary Examiner—Richemond Dorvil
Assistant Examiner—Harold Zintel
(74) Attorney, Agent, or Firm—Howell & Haferkamp, L.C.

(57) ABSTRACT

A method and apparatus for speech analysis and synthesis, including speaker recognition, includes a programmable lattice-ladder notch filter which may be programmed to exhibit both filter poles and filter zeros and thereby exhibit a power spectral density with a better fit to that of a speech frame such that, when energized by a selected signal sample, a more accurate regeneration of speech is achieved. The filter parameters may be reliably and systematically determined as a single solution to a mathematical analysis given a set of gain parameters matching the observed covariance data and having a prescribed set of transmission zeros. These transmission zeros may either be preselected as a design specification, or recovered from analysis of the speech data. A speech frame may be analyzed and provide a set of parameters which may be transmitted to a remote location where a synthesizer may accurately reproduce the speech frame. A method and apparatus for speaker identification, and speaker verification with a smart card are disclosed implementing the lattice-ladder notch (LLN) filter methodology.

27 Claims, 5 Drawing Sheets

OTHER PUBLICATIONS

F.L. Bauer, Ein direktes Iterationsverfahren zur Hurwitz–Zerlegung cines Polymoms, Arch. Elek. Ubertragung, 9 (1955) pp. 285–290.

C.G. Bell, H. Fujisake, J.M. Heinz, K.N. Stevens and A.S. House, Reduction of Speech Spectra by Analysis–by–Synthesis Techniques, J. Acoust. Soc. Am. 33 (1961) pp. 1725–1736.

C.I. Byrnes, S.V. Gusev and A. Lindquist, A convex optimization approach to the rational covariance extension problem, private document.

T.Kailath, Linear Systems, Prentice Hall, N.J. (1980) pp. 93–94, 363–65.

T.T. Georgiou, Realization of Power Spectra from Partial Covariance Sequences, IEEE Trans. on Acoustics, Speech and Signal Processing, vol. ASSP–35, No. 4 (1987) pp. 438–49.

C.I. Byrnes, H.J. Landau and A. Lindquist, On the well–posedness of the rational covariance extension problem in *Current and Future Directions in Applied Mathematics*, M. Alber, B. Hu and J. Rosenthal (editors), Birkhäuser Boston (1997), pp. 83–108.

C.I. Byrnes and A. Lindquist, An algebraic description of the rational solutions of the covariance extension problem, in Linear Circuits, Systems and Signal Processing, C.I. Byrnes, C.F. Martin and R.E. Saeks (editors), Elsevier (1988), pp. 9–17.

C.I. Byrnes and A. Lindquist, On the geometry of the Kimura–Georgiou parameterization of modelling filter, Inter. J. of Control 50 (1989) pp. 2301–2312.

C.I. Byrnes and A. Lindquist, Toward a solution of the minimal partial stochastic realization problem, Comptes Rendus Acad. Sci. Paris, t. 319 (1989) pp. 2301–2312.

C.I. Byrnes and A. Lindquist, Some recent advances on the rational covariance extension problem, Proc. IEEE European Workshop on Computer Intensive Methods in Control and Signal Processing, Prague (1994), pp. 149–158.

C.I.Byrnes and A. Lindquist, On the partial stochastic realization problem, IEEE Trans. Automatic Control AC–42 (1997), to appear.

C.I. Byrnes and A. Lindquist, On a duality between filtering and interpolation, System and Control in the 21st Century, pp. 101–36.

C.I. Byrnes, A. Lindquist, S.V. Gusev and A.V. Matveeve, The geometry of positive real functions with applications to the rational covariance extension problem, Proc. 33rd Conf. on Decision and Control, 3883–3888.

C.I. Byrnes, A. Lindquist, S.V. Gusev and A.V. Matveeve, A complete parameterization of all positive rational extensions of a covariance sequence, IEEE Trans. Automatic Control AC–40 (1995), pp. 1841–1857.

C.I. Byrnes, A. Lindquist, and T. McGregor, Predictability and unpredictability in Kalman filtering, IEEE Transactions Auto. Control AC–36 (1991), pp. 563–579.

C.I. Byrnes, A. Lindquist, and Y. Zhou, Stable, unstable and center manifolds for fast filtering algorithms, Modeling, Estimation and Control of Systems with Uncertainty (G.B. Di Masi, A. Gombani, and A. Kurzhanski, eds.), Birkhauser Boston, Inc. (1991).

C.I. Byrnes, A. Lindquist, and Y. Zhou, On the nonlinear dynamics of fast filtering algorithms, SIAM J. Control and Optimization, 32 (1994) pp. 744–789.

L.O. Chau, C.A. Desoer and E.S. Kuh, *Linear and Nonlinear Circuits*, McGraw–Hill (1989).

G. Heinig, P. Jankowski and K. Rost, Fast Inversion Algorithms of Toeplitz–plus–Hankel Matrices Numerische Mathematik 52 (1988)j pp. 665–682.

W.B. Kleijn, D.J. Kransinski and R.H. Ketchum, Fast methods for the CELP speech coding algorith, IEEE Trans. Acoustics, Speech, and Signal Processing 38 (1990), pp. 1330–1332.

D.G. Luenberger, *Linear and Nonlinear Programming* (Second Edition), Addison–Wesley Publishing Company, Reading, Mass. (1984).

J.D. Markel and A.H. Gray, *Linear Prediction of Speech*, Springer Verlag, Berlin (1976).

M. Minoux, *Mathematical Programming: Theory and Algorithms*, John Wiley and Sons, New York (1986), pp. 94–95.

B. Porat, *Digital Processing of Random Signals*, Prentice Hall (1994).

D. Quarmby, Signal Processing Chips, Prentice Hall (1994).

L.R. Rabiner, B.S. Atal, and J.L. Flanagan, Current methods of digital speech processing, Selected Topics in Signal Process (S. Haykin, editor), Prentice Hall (1989), pp. 112–132.

L.R. Rabiner and R.W. Schafer, *Digital Processing of Speech Signals*, Prentice Hall, Engelwood Cliffs, N.J. (1978).

Vostry, Zdnek, New Algorithm For Polynomial Spectral Factorization with Quadratic Convergence I, Kybernetica 77 (1975).

TR45 Full–Rate Speech Codec Compatibility Standard PN–2972, Electronic Industries Association, 2001 Eye Street N.W., Washington, D.C. 20006 (1990).

F.J. Taylor, Digital Filter Design Handbook, Prentice Hall, N.J. (1994) pp. 340–347.

Speaker Recognition: A Tutorial, Joseph P. Campbell, Jr., Proceedings of the IEEE, vol. 85, No. 9, Sep. 1997, pp. 1436–1462.

* cited by examiner

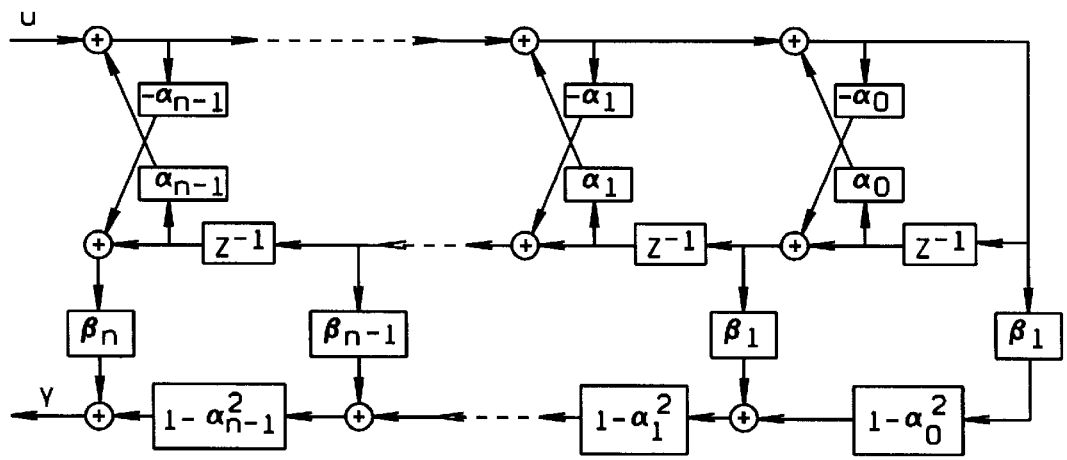
F I G . 4
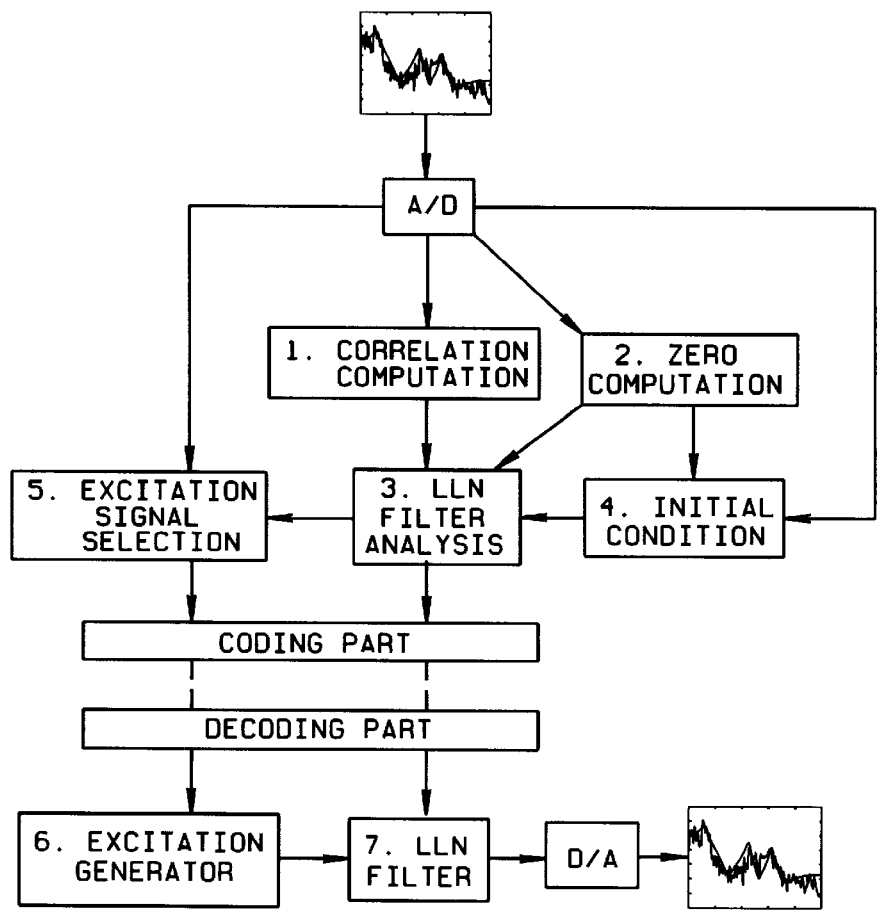
F I G . 5

METHOD AND APPARATUS FOR SPEAKER RECOGNITION USING LATTICE-LADDER FILTERS

CROSS REFERENCE TO RELATED APPLICATION

This application is a continuation-in-part of Ser. No. 08/854,150 now U.S. Pat. No. 5,490,791 filed May 9, 1997.

BACKGROUND OF THE INVENTION

In speech synthesis, the speech pattern is usually divided into frames of a few tens of ms. Conventional vocoders identify stationary speech phonemes into voiced and unvoiced speech (see, e.g., U.S. Pat. Nos. 2,151,091 and 2,243,526). In the art, a single phoneme is regarded to evolve on the order of magnitude of 100 ms. On each of the smaller windows, a linear filter—or digital circuit—is then designed to model the vocal tract. A voiced speech signal can be modeled, and regenerated, as a deterministic process obtained by passing a quasi-periodic signal containing the appropriate pitch frequencies through a linear filter. Analogously, an unvoiced speech signal is modeled, and regenerated, as a random signal obtained by passing white noise through the same linear filter, which models the vocal chords. In this time frame, the parameters characterizing the linear filter as an input/output device are identified using, for example, methods from linear prediction coding (LPC) filter design, and encoded for regeneration. For applications in cellular telephone communications using pitch-excited vocoders, in this same window, the speech pattern is segmented into an identified sequence, also encoded for regeneration, of voiced and unvoiced phonemes. In some popular forms of vocoders, for each unvoiced expression a code book, or look-up table, of white noise signals is searched for that signal which, when passed through the LPC filter, regenerated the response closest to the sampled unvoiced signal. The code for this signal is then transmitted for regeneration. A similar procedure is performed for voiced signals with a periodic pulse train signals in lieu of white noise. Here, however, the vocoder must also perform pitch detection in order to regenerate the voiced signal.

Linear Predictive Coding (LPC) can be used in a variety of different speech coders, such as pitch-excited vocoders, voice-excited vocoders, waveform coders, analysis-by-synthesis coders, and frequency-domain coders (see T. P. Barnwell III, K. Nayebi and C. H. Richardson, *Speech Coding: A Computer Laboratory Textbook*, John Wiley & Sons, New York, 1996, at 85), and the invention disclosed herein can be used in all these contexts and is not confined to a particular vocoder architecture. In fact, LPC filters, sometimes referred to as maximum entropy filters, in devices for such digital signal processing and speech synthesis (see, e.g., U.S. Pat. Nos. 4,209,836 and 5,048,088; D. Quarmby, *Signal Processing Chips*, Prentice Hall, 1994; and L. R. Rabiner, B. S. Atal, and J. L. Flanagan, *Current Methods of Digital Speech Processing*, Selected Topics in Signal Processing, S. Haykin, editor, Prentice Hall, 1989, 112–32) have been used in the prior art.

In applications to automatic speaker recognition a person's identity is determined from a voice sample. This class of problems comes in two types, namely speaker verification and speaker identification. In speaker verification, the person to be identified claims an identity, for example by presenting a personal smart card, and then speaks into an apparatus that will confirm or deny this claim. In speaker identification, on the other hand, the person makes no claim about his identity, does not present a smart card, and the system must decide the identity of the speaker, individually or as part of a group of enrolled people, or decide whether to classify the person as unknown. Common for both applications is that each person to be identified must first enroll into the system. The enrollment (or training) is a procedure in which the person's voice is recorded and the characteristic features are extracted and stored. A feature set which is commonly used in the art is the LPC coefficients for each frame of the speech signal, or some (nonlinear) transformation of these (see e.g. J. M. Naik, Speaker Verification: A tutorial, IEEE Communications Magazine, January 1990, 42–48, at p. 43; J. P. Campbell Jr., Speaker Recognition: A tutorial, Proceedings of the IEEE 85 (1997), 1436–1462; S. Furui, Recent advances in Speaker Recognition, Lecture Notes in Computer Science 1206, 1997, 237–252, Springer-Verlag, at p. 239.)

The circuit, or integrated circuit device, which implements the LPC filter is designed and fabricated using ordinary skill in the art of electronics (see, e.g., U.S. Pat. Nos. 4,209,836 and 5,048,088) on the basis of the specified parameters (specs) which appear as coefficients (linear prediction coefficients) in the mathematical description (transfer function) of the LPC filter. For example, the expression of the specified parameters (specs) is often conveniently displayed in the lattice filter representation of the circuit shown in FIG. 1, containing unit delays $z^{-1}$, summing junctions, and gains.

This is also known as a PARCOR system. The gain (PARCOR) parameters, which are also the reflection coefficients of the random signal (as in FIG. 1), are easily determined from the speech waveform. The design of the associated circuit is immediate with ordinary skill in the art of electronics. In fact, this filter design has been fabricated by Texas Instruments, starting from the lattice filter representation, and is used in the LPC speech synthesizer chips TMS 5100, 5200, 5220 (see, e.g., Quarmby, *Signal Processing Chips*, supra, at 27–29).

The two advantages of LPC filter design are that it is possible to find parameter specs so that the LPC filter produces a signal which reproduces much of the observed spectral properties, and that there exists algorithms for finding the filter parameters from the spectral properties of the observed speech form. FIG. 2 shows a periodogram determined from a frame of speech data together with the power spectral density of a 6th order LPC filter designed from this frame.

A disadvantage of the LPC filter is that its power spectral density cannot match the "valleys," or "notches," in the periodogram and results in speech which is rather "flat," reflecting the fact that the LPC filter is an "all-pole model." This is related to the technical fact that the LPC filter only has poles and has no transmission zeros. To say that a filter has a transmission zero at a frequency $\zeta$ is to say the filter, or corresponding circuit, will absorb damped periodic signals which oscillate at a frequency equal to the phase of $\zeta$ and with a damping factor equal to the modulus of $\zeta$. This is the well-known blocking property of transmission zeros of circuits (see, e.g., L. O. Chua, C. A. Desoer and E. S. Kuh, *Linear and Nonlinear Circuits*, McGraw-Hill, 1989, at 659). This technical fact is reflected in the fact, illustrated in FIG. 2, that the power spectral density of the LPC filter will not match the periodogram at frequencies near its notches. It is also widely appreciated in the signal and speech processing literature that regeneration of human speech requires the design of filters having zeros, without which the speech will sound flat or artificial (see, e.g., C. G. Bell, H. Fujisaki, J. M. Heinz, K. N. Stevens and A. S. House, Reduction of Speech Spectra by Analysis-by-Synthesis Techniques, J. Acoust. Soc. Am. 33 (1961), at 1726; J. D. Markel and A. H. Gray, *Linear Prediction of Speech,* Springer Verlag, Berlin, 1976, at 271–72; L. R. Rabiner and R. W. Schafer, *Digital Processing of Speech Signals,* Prentice Hall, Englewood Cliffs, N.J., 1978, at 105 and 76–78). Indeed, while all-pole filters can reproduce much of human speech sounds, the acoustic theory teaches that nasals and fricatives require both zeros and poles (see, Markel et al., *Linear Prediction of Speech,* supra, at 271–72; Rabiner et al., *Digital Processing of Speech Signals,* supra, at 105, J. P. Campbell Jr., Speaker Recognition: A tutorial, supra at 1442).

As it relates to speech synthesis, this observation is a partial motivation for the device disclosed in U.S. Pat. No. 5,293,448, in which a zero filter is used as a prefilter to the all pole filter to generate higher quality voiced signals. However, the lack of a clear and useful delineation of the extent to which zeros may be arbitrarily assigned to implementable for linear filters both voiced and unvoiced speech has remained a limiting factor in the design of improved devices for signal and speech processing.

SUMMARY OF THE INVENTION

The present invention comprises a method and device for the systematic design of linear filters having both desired zero structure and the standard spectral features required to regenerate the appropriate voiced and unvoiced signals. The inventors' implementations and tests suggest that the preselection of nontrivial zero structure improves the regeneration of human speech. Applying this methodology for filter design to the same speech data and periodogram as in FIG. 2, an alternative 6th order filter is obtained, whose power spectral density is less flat and provides a better approximation, reflecting the fact that the filter is designed to have transmission zeros near the minima of the periodogram (see FIG. 3).

In automatic control, filters having prescribed transmission zeros are referred to as notch filters. Notch filters have been used as dynamic compensators to attenuate stable harmonic fluctuations by achieving desired pole-zero cancellations. Although the desirability of notches in the power spectrum of the filters disclosed in the present invention plays a quite different role for signal processing and speech synthesis than the role played by notch filters in automatic control, the analogy suggests that we refer to the filters disclosed here as LLN filters. This acronym also reflects the lattice-ladder architecture which can be used to implement these filters, as disclosed below. Lattice-ladder architecture representations of various filters occur in prior art, but the lack of either a method or a means of tuning the filter parameters in this representation to match the desired spectral properties and the notches in the spectrum of the speech waveform has prohibited its use in speech processing for high quality speech analysis and synthesis. Such method and means are disclosed herein. We note that an LLN filter is defined, independent of the architecture used to represent it, by the specification of the filter zeros and of the window of covariances computed from the speech frame. The lattice-ladder architecture is the implementation of one particular state-space representation of the LLN filter transfer function, and the theory of linear systems teaches that each such state space representation (which when minimal dimension are all equivalent under a state-space transformation) *Linear Systems,* T. Kailath, Prentice-Hall, N.J. 1980 (pages 363–365) leads directly to an equivalent architecture represented in terms of gains, summing junctions and unit delays (see e.g. Kailath, pages 93–94). For purposes of illustrating the preferred embodiment, we teach the implementation of LLN filters in terms of the lattice ladder architecture. It is also disclosed here that LPC filters, and their representation in a lattice filter architecture, can be obtained as a specialization of the disclosed LLN filter design.

It is widely appreciated in the signal and speech processing community that regeneration of human speech requires the design of filters having zeros. The effect of zeros is to enable the power spectral density to provide a spectral envelope which better fits the speech waveform. For example, this enables the design of a filter which is sensitive to the location of the source of the speech within the vocal tract as well as providing a model encompassing the nasal tract (see, Bell et al., Reduction of Speech Spectra by Analysis-by-Synthesis Techniques, supra, at 1726–27; and Markel et al., *Linear Prediction of Speech,* supra, at 271–72). For such reasons, the method and device for the systematic design of linear filters having both desired zero structure and the standard spectral features required to regenerate the appropriate voiced and unvoiced signals has application in the area of high quality speech synthesis.

This method and design has application in speech synthesis for another reason, especially in applications involving the compression and transmission of speech as it occurs, for example, in digital cellular telephone communications. We have already described the use of LPC filters in speech synthesis in a pitch-excited vocoder environment and noted the need for filters, such as LLN filters, which both have desired transmission zeros and match the covariances determined from speech data. LLN filters will enjoy this advantage in use in a variety of other vocoders, such as voice-excited vocoders, waveform vocoders, analysis-by-synthesis vocoders and frequency-domain vocoders. In addition, for speech synthesis using one of the analysis-by-synthesis vocoders, a code-excited linear predictor coder (CELP), a codebook of (typically) 1024 signals, or codewords, is stored and is searched at the transmitting device for the excitation codeword which will best regenerate the observed speech signal. The identification number, or code number, of this signal is then transmitted along with a scaling factor and the LPC gains to the receiving device for regeneration. Currently the most computational, and time, intensive activity during this window is the search through look-up tables to find the best signal with which to reproduce the observed signal using an LPC filter. By using a more accurate spectral envelope, through the method disclosed herein, for the spectrum of the observed speech waveform, it is expected to be able to reduce the number of candidate signals with which to reproduce the observed signal, thereby shortening the most time-intensive part of the encoding and speech compression activity.

For the same reasons, this method and design may be used in devices for speech recognition, by providing a device for both developing filter parameters from observed speech and comparing the filter parameters so-obtained with parameters already stored for particular individuals. The LLN filter design disclosed herein uses zeros as well as poles, while the prior art LPC filter is an all-pole filter, and should provide more accurate encoding and identification of human speech. Indeed, in the prior art, the motivation for using LPC filters is that the vocal tract can be modeled using a LPC filter and that these coefficients are then related to the anatomy of the speaker and are thus speaker specific. However, the LPC model assumes a vocal tract excited at a closed end, which is the situation only for voiced speech (J. P. Campbell Jr., Speaker Recognition: A tutorial, supra at 1442). Hence it is common that the feature selection only processes the voiced segments of the speech (J. P. Campbell Jr., Speaker Recognition: A tutorial, supra at 1455). Since the LLN filter is more general, other segments can also be processed, thereby extracting more information about the speaker.

It is expected that this invention will have application as an alternative for the use of LPC filter design in other areas of signal processing and statistical prediction including, for example, speech compression, speech synthesis from stored coded speech, or text-to-speech synthesis. In each of these areas, the same fundamental spectral estimation problem arises.

While the principal advantages and features of the present invention have been briefly explained and illustrated in the foregoing discussion, a greater understanding and appreciation for the various aspects of the invention may be attained by referring to the drawings and the description of the preferred embodiment which follow.

BRIEF DESCRIPTION OF THE DRAWINGS

FIG. 4 is a schematic diagram of a lattice-ladder representation the present invention (LLN filter);

FIG. 5 is a schematic diagram of a speech coder comprising a speech analyzer portion and a speech synthesis portion;

DETAILED DESCRIPTION OF THE PREFERRED EMBODIMENT

Figure 1:
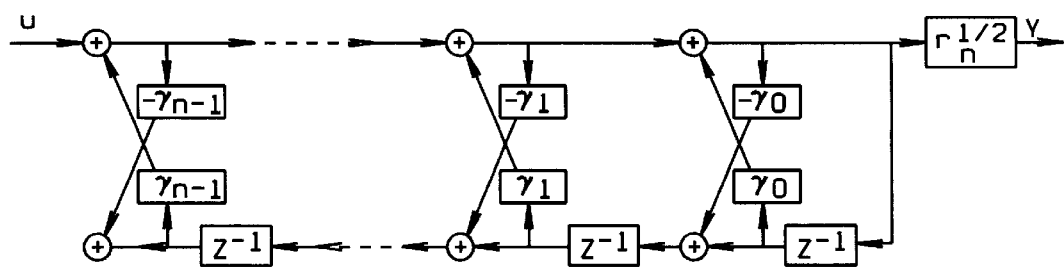
FIG. 1 is a schematic diagram of a lattice representation of an LPC filter as known in the prior art.
Figure 2:
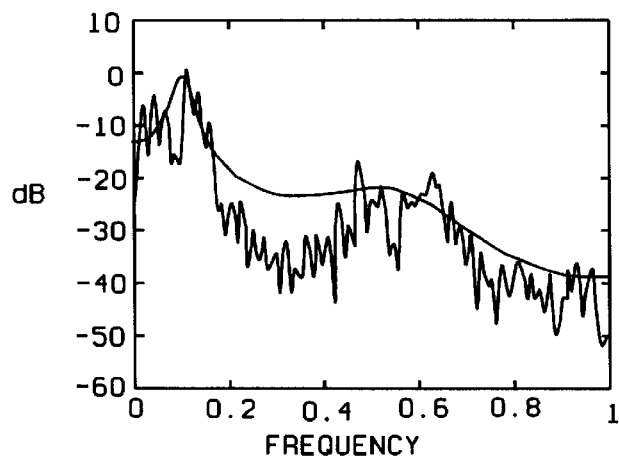
FIG. 2 is a periodogram determined from a frame of speech data together with the power spectral density of a sixth order LPC filter designed from this frame.
Figure 3:
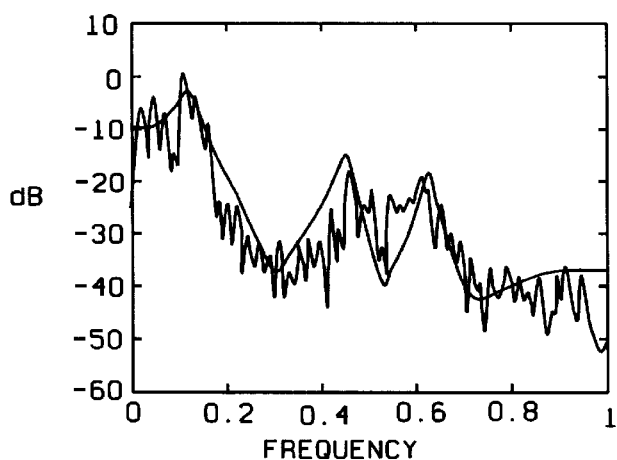
FIG. 3 is the periodogram of FIG. 2 with the power spectral density of an alternative sixth order filter of the present invention.

Conventional vocoders perform three tasks: determining a linear filter which models the vocal tract, determining an appropriate model of the excitation signal, and the regeneration of the observed signal when the excitation signal is generated and used to excite the linear filter. Naturally, tasks such as speech compression and transmission are accomplished by encoding and decoding the filter parameters and the identifying characteristics of the excitation signal within a class of signals. As discussed above, there are standard electronic devices which perform each of these three tasks, both separately and in an integrated form, in a variety of vocoder architectures. Also discussed is the fact that the LPC filter is the most commonly used linear filter in the prior art for modeling the vocal tract. The basic design feature of such a filter is that it produces a synthetic speech signal whose power spectrum matches the first n+1 covariance coefficients $c_0, c_1, c_2, \ldots, c_n$ extracted from the speech data in the window; i.e., besides being stable, the transfer function w(z) of the LPC filter satisfies $$|w(e^{j\theta})|^2 = \hat{c}_0 + 2\hat{c}_1 \cos\theta + 2\hat{c}_2 \cos 2\theta + \ldots, \qquad (2.1)$$

where $$\hat{c}_k = c_k \text{ for } k=0, 1, \ldots, n. \qquad (2.2)$$

(For example, for unvoiced speech, this means that the LPC circuit produces a random signal, with specified first n+1 covariances $c_0, c_1, \ldots, c_n$, when driven by white noise.) It is this property which makes the LPC filter a decent model of the vocal tract.

However, as pointed out above, the drawback of the LPC filter is that it is an all-pole filter. Atal has pointed out that the perceived differences between real speech and the best synthetic speech obtainable using an LPC filter are at least partially due to the all-pole model restriction (see, Markel et al., *Linear Prediction of Speech*, supra, at 271). The need for introducing zeros has led to many ad hoc methods, but the absence of a systematic design methodology for incorporating appropriate zeros is a limiting factor in high quality speech analysis and synthesis (see, e.g., Markel et al., *Linear Prediction of Speech*, supra, at 271–275). The absence of a systematic design methodology for incorporating appropriate zeros is also a limiting factor in the design of speaker verification identification and enrollment devices which would accommodate a broader set of human speech that those produced as voiced speech (J. P. Campbell Jr., Speaker Recognition: A tutorial, supra at 1442 and at 1455). An advantage of the present invention is that it includes a filter which satisfies the same covariance properties (2.1)–(2.2) as the LPC filter, but for which the zeros can be set arbitrarily.

In fact, in this disclosure it is described how to design a filter, and how to implement this filter with a circuit, which will be useful in signal processing, speech synthesis, and automatic speaker recognition. This shall be referred to as a LLN filter, because it is a notch filter, designed to have prescribed zeros, and can be implemented, for example, using a lattice-ladder architecture, as described in detail below. The circuit meets the following specifications.

(i) For the covariance coefficients $c_0, c_1, c_2, \ldots, c_n$ extracted from the speech data in the window, the (stable) transfer function of the LLN filter satisfies $$|w(e^{j\theta})|^2 = \hat{c}_0 + 2\hat{c}_1 \cos\theta + 2\hat{c}_2 \cos 2\theta + \ldots, \qquad (2.3)$$

where $$\hat{c}_k = c_k \text{ for } k=0, 1, \ldots, n. \qquad (2.4)$$

(ii) The filter has prescribed zeros, $\zeta_1, \zeta_2, \ldots \zeta_n$, inside the unit disc.

In specifying the covariance coefficients, we also include equivalent forms of specifying these statistical data, such as the representation of covariance data by PARCOR parameters, reflection coefficients, Schur parameters or their statistical equivalents. In specifying the filter zeros, we also include equivalent forms of specifying zeros, such as the coefficients of the zero polynomial, the zero polynomial or any of their functional equivalents. These, and any other equivalents, would be understood by one of ordinary skill in the art as included within the scope of the invention. For brevity, the inventors shall use the terms covariance and zero, and these terms shall be understood as being broadly defined to include these and other such equivalents.

When represented in the lattice-ladder architecture, the LLN filter is determined by the parameters shown in FIG. 4.

As for the lattice representation of the LPC filter, the LLN filter consists of gains, which are the parameter specs, unit delays $z^{-1}$, and summing junctions and therefore can be easily mapped onto a custom chip or onto any programmable digital signal processor (e.g., the Intel 2920, the TMS 320, or the NEC 7720) using ordinary skill in the art (see, e.g., Quarmby, *Signal Processing Chips,* supra, at 27–29).

It is observed that the lattice-ladder filter representation builds on the lattice filter topology, but provides for the incorporation of the spec parameters denoted by β, which allow for the incorporation of zeros into the filter design. In fact, the lattice filter representation of an all-pole (LPC) filter can be designed from the lattice-ladder filter architecture representing an LLN filter by setting the parameter specifications:

$$\beta_0 = r_n^{1/2}, \beta_1 = \beta_2 = \ldots = \beta_n = 0 \text{ and } \alpha_k = \gamma_k \text{ for } k=0, 1, \ldots, n-1.$$

While it has been appreciated that the additional features of the lattice-ladder filter make it possible to design filters with nontrivial zero structure, the limiting factors in this design strategy have been the lack of knowledge as to how arbitrarily one could make the specifications of the filter zeros, how may filters (if any) achieve this design specification, and how to design such filters if they do indeed exist. The first of these questions has been successfully addressed in the literature by T. T. Georgiou, Realization of Power Spectra from Partial Covariance Sequences, IEEE Trans. on Acoustics, Speech and Signal Processing, ASSP-35 (1987) 438–449, where it is shown that such filters exist for any choice of zeros (inside the unit disc). The second theoretical issue was resolved in the literature in the publication C. I. Byrnes, A. Lindquist, S. V. Gusev and A. V. Matveev, A Complete Parameterization of All Positive Rational Extensions of a Covariance Sequence, IEEE Trans. Automatic Control AC-40 (1995), 1841–1857, where it is also shown that the choice of zeros can be made arbitrarily while maintaining the ability to match the covariance coefficients and that this can be done in only one way, so that the resulting filter is uniquely determined by these design specifications. These theoretical results were purely existence arguments and did not, however, resolve the issue of how to effectively compute the gains an implementable digital filter; for example, in the lattice-ladder representation we propose here. This left the long felt need in the art for a solution to this problem which would permit the design and use of an appropriate filter for speech analysis, speech synthesis, and automatic speaker recognition.

The present invention answers the third question and includes a method for prescribing the zeros, so that it is possible to design and implement the unique filter which can produce output signals with the desired spectral properties and a spectral envelope with the desired notches. We also disclose that this filter can be represented in a lattice-ladder architecture and that an efficient algorithm for the computation of the (LLN) filter parameters is disclosed along with a method for determining the filter zeros from observed data. In the present method, the filter poles are completely determined by the observed correlation coefficients (i) and the prescription of transmission zeros (ii). Also disclosed is the fact that the filter poles cannot, in general, be prescribed first, with the zeros then determined by the observed data. This distinguishes the disclosed method and the resulting circuit design and the method and design disclosed in U.S. Pat. No. 5,293,448, wherein a lattice filter representation of a zero filter is tuned to the prior choice of the all-pole (or LPC) filter, represented for example in ladder form. Another advantage of the present invention is in the use of zeros to reproduce unvoiced, as well as voiced, speech.

With the present method and circuit design, it is possible to incorporate the preselection of arbitrary transmission zeros into the design specifications for a (notch) filter which reproduces an approximation for an observed signal when driven by the appropriate excitation signal, and there exists algorithms for finding the filter parameters $$\alpha_0, \alpha_1, \ldots, \alpha_{n-1} \text{ and } \beta_0, \beta_1, \ldots, \beta_n \qquad (2.5)$$

from the design specifications.

FIG. 5 illustrates a possible speech coding environment of the invention. Each box in this flow chart represents an algorithm or computation which can be found in existing software packages or hardware. Disclosed below is the inventors' best implementation of such algorithms.

The block diagram in FIG. 5 consists of two parts. The top part is the transmitter (analyzer), which computes the filter parameters, gain, and choice of excitation model as explained below. These parameters are coded, in the usual manner, and transmitted to the receiver (synthesizer) and decoded. The receiver consists of an excitation generator providing the appropriate input to the LNN filter (see FIG. 4), thus set with the appropriate parameters.

To improve the numerical properties of the filter computation the digitized signal may be passed through a pre-emphasis filter to reduce the dynamical range of the speech spectrum (see, Barnwell III et al., *Speech Coding: A Computer Laboratory Textbook,* supra, at 86–87). To compensate for this, the inverse filter (deemphasis filter) is placed at the output of the LNN filter. To simplify matters, in FIG. 5, these filters are included in the A/D and D/A blocks, respectively, which themselves may be omitted if the source and result are desired to be digital signals.

Determination of the covariance coefficients: Box 1 determines the covariance sequence $c_0, c_1, \ldots, c_n$ from the digital waveform and is standard practice using ordinary skill in the art. For example, the Autocorrelation Method can be used (see, Barnwell III et al., *Speech Coding: A Computer Laboratory Textbook,* supra, at 91–93). Also, U.S. Pat. No. 4,775,951 discloses a device for computing correlation functions and coefficients.

Determination of the transmission zeros: Box 2 determines the filter zeros from the digital waveform, if in fact the zeros have not been prescribed as part of the application specs. There are several alternatives for systematically choosing the zeros. First disclosed is the recursive algorithm which is believed to represent the best available state of the art.

It is desired to determine the set of desired transmission zeros, $\zeta_1, \zeta_2, \ldots, \zeta_n$. In fact, for present purposes it is actually needed to determine the corresponding zero polynomial $$B(z) := (z-\zeta_1)(z-\zeta_2) \ldots (z-\zeta_n) = z^n + b_1 z^{n-1} + \ldots + b_n. \qquad (2.6)$$

So that the resulting filter will be implementable, the zeros are restricted to be self-conjugate, i.e., so that for each i there exists a j so that $\zeta_j = \bar{\zeta}_i$, where the bar represents complex conjugation. Consequently, the coefficients $b_i$ of the zero polynomial B(z) are all real numbers.

It is the standard practice, when using an all-pole filter to use additional poles in order to compensate for the lack of zeros (see, Rabiner et al., *Digital Processing of Speech Signals,* supra, especially at Section 3.4.1, p. 99). The present method is based on the capability of using an LLN filter of lower order than would be required by the LPC filter and taking advantage of the availability of additional autocorrelation data to determine the zero structure by standard systems and signal processing algorithms.

Using the Autocorrelation Method (see, Barnwell III et al., *Speech Coding: A Computer Laboratory Textbook,* supra, at 91–93), or some version of Burg's algorithm as taught in B. Porat, *Digital Processing of Random Signals,* Prentice Hall, 1994, at 176, first compute the reflection coefficients $$\gamma_{m+1-n}, \gamma_{m+2-n}, \ldots, \gamma_{m+n}$$

for some $m \geq n$, i.e., the PARCOR coefficients succeeding those used in the LPC filter, and then solve the Toeplitz system $$\begin{bmatrix} \gamma_m & \gamma_{m-1} & \cdots & \gamma_{m+1-n} \\ \gamma_{m+1} & \gamma_m & \cdots & \gamma_{m+2-n} \\ \vdots & \vdots & \ddots & \vdots \\ \gamma_{m+n-1} & \gamma_{m+n-2} & \cdots & \gamma_m \end{bmatrix} \begin{bmatrix} \sigma_1 \\ \sigma_2 \\ \vdots \\ \sigma_n \end{bmatrix} = - \begin{bmatrix} \gamma_{m+1} \\ \gamma_{m+2} \\ \vdots \\ \gamma_{m+n} \end{bmatrix}, \quad (2.7)$$

for the parameters $\sigma_1, \sigma_2, \ldots \sigma_n$. If the polynomial $$\sigma(z) = z^n + \sigma_1 z^{n-1} + \ldots + \sigma_n,$$

has all its roots inside the unit disc, simply set $B(z)=\sigma(z)$. More generally, take $B(z)$ to be the stable spectral factor of $Q(z):=\sigma(z)\sigma(z^{-1})$, computed as in Appendix A and normalized so that the leading coefficient (of $z^n$) is 1.

Alternative methods can be based on any of the procedures described in Markel et al., *Linear Prediction of Speech,* supra, at 271–75, including Prony's method with constant term. As pointed out above, these methods are not by themselves good for producing synthetic speech, because they do not satisfy (2.1)–(2.2). However, here only the zero computation is used, and in Box 3 the poles are determined to satisfy (2.1)–(2.2). As another alternative, the choice of zeros can also be done by determining the phase of the zeros from the notches in the observed spectrum, as represented by a periodogram or as computed using Fast Fourier Transforms (FFT), by any standard algorithm for determining local minima.

Coding of the LLN filter parameters: The key in the present algorithm is to be able to systematically determine the gain parameters (2.5) to match the observed covariance data and to have prescribed transmission zeros. This is done in Box 3.

As a result of the basic theory developed in C. I. Byrnes and A. Lindquist, An Algebraic Description of the Rational Solutions of the Covariance Extension Problem, Linear Circuits, Systems and Signal Processing, C. I. Byrnes, C. F. Martin and R. E. Saeks (editors), Elsevier 1988, 9–17; C. I. Byrnes and A. Lindquist, On the Geometry of the Kimura-Georgiou Parameterization of Modeling Filter, Inter. J. of Control 50 (1989), 2301–2312; C. I. Byrnes and A. Lindquist, Toward a Solution of the Minimal Partial Stochastic Realization Problem, Comptes Rendus Acad. Sci. Paris, t. 319, Série I (1994), 1231–1236; C. I. Byrnes and A. Lindquist, Some Recent Advances on the Rational Covariance Extension Problem, Proc. IEEE European Workshop on Computer Intensive Methods in Control and Signal Processing, Prague 1994, 149–158; C. I. Byrnes and A. Lindquist, On the Partial Stochastic Realization Problem, IEEE Trans. Automatic Control AC42 (1997); C. I. Byrnes, A. Lindquist, and T. McGregor, Predictability and Unpredictability in Kalman Filtering, IEEE Transactions Auto. Control AC-36 (1991), 563–579; C. I. Byrnes, A. Lindquist, and Y. Zhou, *Stable, Unstable and Center Manifolds for Fast Filtering Algorithms,* Modeling, Estimation and Control of Systems with Uncertainty (G. B. Di Masi, A. Gombani, and A. Kurzhanski, eds.), Birkhauser Boston Inc., 1991; and C. I. Byrnes, A. Lindquist, and Y. Zhou, On the Nonlinear Dynamics of Fast Filtering Algorithms, SIAM J. Control and Optimization, 32 (1994), 744–789, and culminating in Byrnes et al., A Complete Parameterization of All Positive Rational Extensions of a Covariance Sequence, supra, at 1841–1857; C. I. Byrnes, A. Lindquist, S. V. Gusev and A. V. Matveev, The Geometry of Positive Real Functions with Applications to the Rational Covariance Extension Problem, Proc. 33rd Conf. On Decision and Control, 3883–3888; C. I. Byrnes and A. Lindquist, On a Duality Between Filtering and Interpolation, Systems and Control in the 21st Century (C. I. Byrnes, B. N. Datta, D. Gilliam, C. F. Martin, eds.) 101–136; C. I. Byrnes, H. J. Landau and A. Lindquist, On the Well-Posedness of the Rational Covariance Extension Problem, Current and Future Directions in Applied Mathematics, M. Alber, B. Hu and J. Rosenthal (editors), Birkhäuser Boston, 1997, 83–108; and C. I. Byrnes, S. V. Gusev and A. Lindquist, A Convex Optimization Approach to the Rational Covariance Extension Problem, it is known that for any window of correlation coefficients, as above, and any preselection of transmission zeros, there exists one and only one linear filter having both desired zero structure and the standard statistical features required to regenerate the observed random signal. The present invention comprises a method for systematically designing the specified parameters for the linear filter which achieves this. The basis for this systematic design method, and the resulting device, is the discovery that the filter parameters can indeed be obtained from a standard kind of optimization procedure, applied to a formulation of the problem the inventors have discovered and now disclose.

There are two sets of inputs to Box 3, the covariance coefficients $c_0, c_1, \ldots, c_n$, delivered by Box 1, and the set of transmission zeros (2.6), delivered by Box 2 and collected in the polynomial $B(z)$. The third input from Box 4 may or may not be present, as explained below. Defining $\psi$ to be the objective function $$\psi(q_0, q_1, \ldots, q_n) = c_0 q_0 + c_1 q_1 + \ldots + c_n q_n - 1/2\pi \int_{-\pi}^{\pi} |B(e^{j\theta})|^2 \log Q(e^{j\theta}) d\theta, \quad (2.8)$$

in the n+1 variables $q_0, q_1, \ldots, q_n$, where $$Q(z) = q_0 + \tfrac{1}{2} q_1(z + z^{-1}) + \tfrac{1}{2} q_2(z^2 + z^{-2}) + \ldots + \tfrac{1}{2} q_n(z^n + z^{-n}), \quad (2.9)$$

and log is the natural logarithm, minimize the objective function (2.8) over all choice of variables $(q_0, q_1, \ldots, q_n)$ such that.

$$Q(e^{j\theta}) > 0 \text{ for all } \theta \in [-\pi, \pi]. \quad (2.10)$$

The present invention shows that there is a unique such minimum. Given the minimizing $(q_0, q_1, \ldots, q_n)$ and the corresponding pseudo polynomial (2.9), next determine the stable polynomial $$A(z) = a_0 z^n + a_1 z^{n-1} + \ldots + a_n \quad (2.11)$$

satisfying $$A(z)A(z^{-1}) = Q(z), \quad (2.12)$$

which can be done by any of the procedures described in Appendix A. Then the present invention shows that the transfer function $$\omega(z) = \frac{1}{2}\frac{A(z)}{B(z)} \quad (2.13)$$

satisfies the specifications (i) and (ii) for an LLN filter. Finally, determine the gain parameters (2.5) in the following way:

For k=n, n−1, . . . , 1, solve the recursions $$\begin{cases} a_{k-1,j} = a_{kj} + a_{k-1}a_{k,k-j}, \; a_{nj} = a_j \\ a_{k-1} = -\frac{a_{kk}}{a_{k0}} \\ b_{k-1,j} = b_{kj} - \beta_k a_{k,k-j}, \; b_{nj} = b_j \\ \beta_k = \frac{b_{kk}}{a_{k0}} \end{cases} \quad (2.14)$$

For j=0, 1, . . . , k, and set $\beta_o=+b_{oo}/a_{oo}$.

Passing from the parameterization (2.13) to the parameterization (2.14) is a well-known procedure (see, e.g. K. J. Åström, *Introduction to Stochastic Realization Theory*, Academic Press, 1970; and K. J. Åström, *Evaluation of Quadratic Loss Functions for Linear Systems*, Fundamentals of Discrete-time systems: A Tribute to Professor Eliahu I. Jury, M. Jamshidi, M. Mansour, and B. D. O. Anderson (editors), IITSI Press, Albuquerque, N. Mex., 1993, 45–56). This algorithm is recursive, using only ordinary arithmetic operations, and can be implemented with an MAC mathematics processing chip using ordinary skill in the art.

The minimization of (2.8) given the constraints (2.10) is a convex optimization problem for which there are many standard algorithms and software that determine the minimizing $(q_0, q_1, \ldots, q_n)$ recursively. Most generic codes for convex optimization will compute the gradient (first derivative) and/or Hessian (second derivative) for use in a recursive algorithm, such as defined, for example, by Newton's method. However, for the specific problem of minimizing__, both the gradient and the Hessian can be computed directly, without computing the values of the function (2.8), using the computation of the covariances of an associated process and using Fourier transforms. While the covariance data are well known to be computable using just recursive algorithms employing only ordinary arithmetic operations (see, Porat, *Digital Processing of Random Signals*, supra, especially at 175–177), we disclose here that the computation of the Fourier coefficients can be computed using recursive algorithms employing only ordinary arithmetic operations. For this reason, a direct application of Newton's method with the computations of the gradient and Hessian described below gives an algorithm believed to be the best state of the art. The resulting recursive minimization algorithm, using only arithmetic operations, has been encoded in MATLAB and can be implemented with an MAC mathematics processing chip using ordinary skill in the art.

More precisely, the gradient is given by $$\frac{\partial \varphi}{\partial q_k}(q_0, q_1, \ldots, q_n) = c_k - \overline{c}_k \quad (2.15)$$

where $$\overline{c}_k = \frac{1}{2\pi}\int_{-\pi}^{\pi} e^{jk\theta}\frac{|B(e^{j\theta})|^2}{Q(e^{j\theta})} d\theta \text{ for } k = 0, 1, 2, \ldots, n \quad (2.16)$$

are the covariances corresponding to a process with spectral density.

$$\frac{|B(e^{j\theta})|^2}{Q(e^{j\theta})} = \overline{c}_0 + 2\sum_{k=1}^{\infty} \overline{c}_k \cos(k\theta). \quad (2.17)$$

The gradient is thus the difference between the given partial covariance sequence and the partial covariance sequence corresponding to the choice of variables $q_0, q_1, \ldots, q_n$ at which the gradient is calculated. The minimum is attained when this difference is zero. The covariances $c_0, c_1, \ldots, c_n$ can be determined, via ordinary arithmetic operations, by first performing the factorization (2.12) by one of the procedures disclosed in Appendix A and then applying the procedure described in Appendix B to A(z).

To implement Newton's method, the Hessian of (2.8) is also needed, i.e., the matrix function of second derivatives of (2.8), i.e., $$H_{ij}(q_0, q_1, \ldots, q_n) = \frac{1}{2}(h_{i+j}+h_{i-j})i, j=0, 1, 2, \ldots, n, \quad (2.18)$$

where $$h_k = \frac{1}{2\pi}\int_{-\pi}^{\pi} e^{jk\theta}\frac{|B(e^{j\theta})|^2}{Q(e^{j\theta})^2} d\theta \text{ for } k = 0, 1, 2, \ldots, 2n \quad (2.19)$$

and $h_{-k}=h_k$. Moreover, $h_0, h_1, \ldots, h_{2n}$ are the 2n+1 first Fourier coefficients of the spectral representation $$\frac{|B(e^{j\theta})|^2}{Q(e^{j\theta})^2} = h_0 + 2\sum_{k=1}^{\infty} h_k \cos(k\theta), \quad (2.20)$$

so, in the same way as above, the procedure of Appendix B can be used to compute $h_0, h_1, \ldots, h_2$. Since the Hessian is the sum of a Toeplitz matrix and a Hankel matrix, the search direction at the point $q_0, q_1, \ldots, q_n$, i.e., $$d := H^{-1}(\overline{c}-c) \quad (2.21)$$

(where c and c are the n+1 vectors with components $c_0, c_1, \ldots, c_n$ and $c_0, c_1, \ldots, c_n$ respectively) can then be determined directly or via a fast algorithm (see, G. Heinig, P. Jankowski and K. Rost, Fast Inversion Algorithms of Toeplitz-plus-Hankel Matrices, Numerische Mathematik 52 (1988), 665–82).

In fact, Newton's method amounts to recursively updating the vector q with components $q_0, q_1, \ldots, q_n$ according to the rule $$q^{k+1}=q^k+\lambda_k d^k, \quad (2.22)$$

where $d^k$ is the search direction (2.21) at the point $q^k$ (see, e.g., M. Minoux, *Mathematical Programming: Theory and Algorithms*, John Wiley and Sons, New York, 1986, at 94–95). Here the step size $\lambda_k$ is chosen so that (i) $q^{k+1}$ satisfies the constraints (2.10), (ii) Wolf's Test (see, D. G. Luenberger, *Linear and Nonlinear Programming* (Second Edition), Addison-Wesley Publishing Company, Reading, Mass., 1984 at 214.), which amounts to checking that $$(c-\tilde{c}^{k+1})'d^k \geq (1-\delta)(c-\tilde{c}^k)'d^k$$

is fulfilled for some specified $0<\delta<\frac{1}{2}$, where $c^k$ denotes c in step k and ' denotes transpose, where test (ii) is optional. Take $\lambda_k=1$ as long as these conditions are satisfied; otherwise successively take half as long a step until conditions (i) and (ii) are satisfied. Test (2.10) in a preselected number of points on the interval $[-\pi, \pi]$ and/or through the positivity test performed in conjunction with determining c (see Appendix A). The initial point $q^0$ can be obtained via $$|A^o(e^{j\theta})|^2 = q_0^o + q_1^o \cos\theta + q_2^o \cos 2\theta + \ldots + q_n^o \cos n\theta, \quad (2.23)$$

where $A^o(z)$ is an arbitrary stable polynomial. For $A^o(z)$ one could choose the polynomial A(z) obtained by the LPC (maximum entropy) procedure, i.e., the Szegö polynomial, generated by the Levinson-Durbin algorithm (see, e.g., Byrnes et al., A Complete Parameterization of All Positive Rational Extensions of a Covariance Sequence, supra, at 1843–44; and Porat, *Digital Processing of Random Signals*, supra, at 159) and appropriately normalized by $(r_n)^{-\frac{1}{2}}$ in the terminology of Byrnes et al., A Complete Parameterization of All Positive Rational Extensions of a Covariance Sequence, supra. However, the preferred procedure is to determine the initial condition $A^o(z)$ by a procedure described below. This is done in Box 4.

Figure 6:
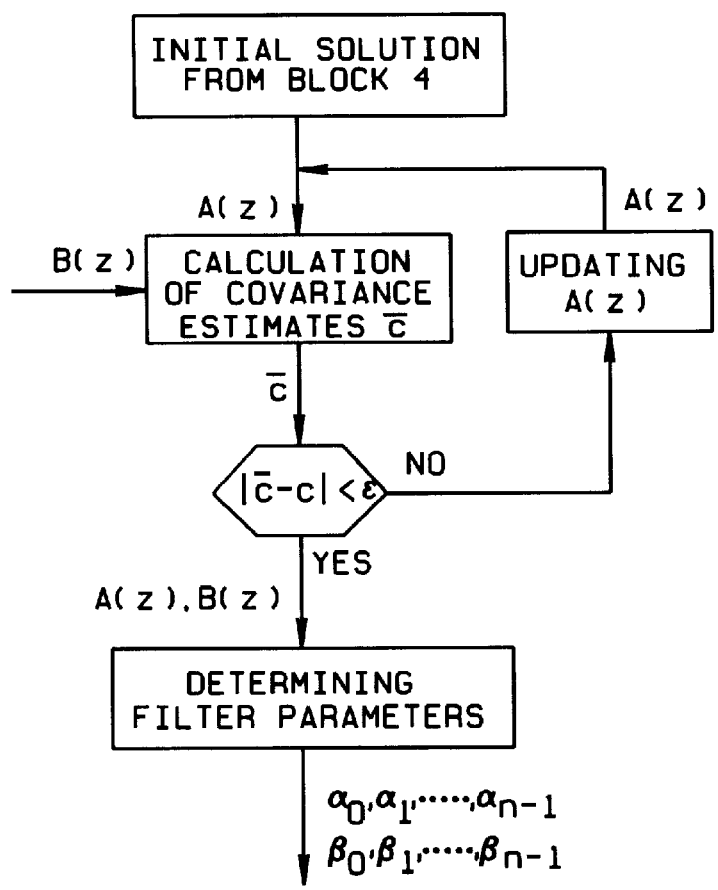
FIG. 6 is a block diagram, or flow chart, of the mathematical process required to determine the LLN filter parameters.

Given c from Box 1 and B(z) from Box 2, the preferred recursive selection method in Box 3 is described in the flow chart of FIG. 6.

Starting with the initial pole polynomial, in each step first determine the vector c with components $c_0, c_1, \ldots, c_n$ via (2.17) in the manner described above, taking $Q(e^{j\theta})=|A(e^{j\theta})|^2$; see Appendix B. Next, test whether the current approximation c of the partial covariance sequence c is within the tolerance_ of c. If it is not, continue the recursive algorithm by updating A(z). If it is, terminate the recursive steps and determine the filter parameters (2.5) via the recursions (2.14). The updating is performed by taking a Newton step (2.22) as described above, computed from the present A(z) by setting $Q(e^{j\theta}):=|A(e^{j\theta})|^2$. The updated A(z) polynomial is obtained by factoring the pseudo polynomial $Q^{k+1}(z)$ corresponding to the updated point $q^{k+1}$ by the procedures of Appendix A, thereby also checking that condition (i) is fulfilled.

Determining the initial condition: In Box 4, we determine, from the speech data, the initial condition for the algorithm in Box 3. An obvious choice would be the pole polynomial produced using a standard LPC filter design procedure. The preferred initialization procedure is to form the signal $x_0, x_1, x_2, \ldots$ from the speech signal $y_0, y_1, y_2, \ldots$ and the given zero polynomial (2.6) via the recursion $$b_0 \chi_{a+n} + b_1 \chi_{a+n-1} + \ldots + b_n \chi_a = y_{t+n} \quad (2.24)$$

by setting $x_t=0$ for $t<0$, then to compute the sample covariances $$d_k = \frac{1}{N-k} \sum_{t=k}^{N-1} x_t x_{t-k} \quad k=0, 1, 2, \ldots, n, \quad (2.25)$$

and finally take the initial A(z) to be the LPC pole polynomial corresponding to the x signal, computed as above but with $c_0, c_1, \ldots, c_n$ exchanged for $d_0, d_1, \ldots, d_n$. Another good alternative procedure is obtained by running the fast algorithm disclosed in Byrnes et al., On the Nonlinear Dynamics of Fast Filtering Algorithms, supra, backwards, using the PARCOR coefficients $$\gamma 0, \gamma 1, \ldots, \gamma_{m+n-1}$$

for some $m \geq n$, determined from the speech data as described above. For $k=0, 1, 2, \ldots, m$, determine $$G_k = \begin{bmatrix} 1-\gamma_{k+n-1}^2 & -\gamma_{k+n-1}\gamma_{k+n-2} & -\gamma_{k+n-1}\gamma_{k+n-3} & \cdots & -\gamma_{k+n-1}\gamma_k \\ 0 & 1-\gamma_{k+n-2}^2 & -\gamma_{k+n-2}\gamma_{k+n-3} & \cdots & -\gamma_{k+n-2}\gamma_k \\ 0 & 0 & 1-\gamma_{k+n-3}^2 & \cdots & -\gamma_{k+n-3}\gamma_k \\ \vdots & \vdots & \vdots & & \vdots \\ 0 & 0 & 0 & \cdots & 1-\gamma_k^2 \end{bmatrix}$$

and, given the zero polynomial (2.6), compute.

$$\begin{bmatrix} x_1 \\ x_2 \\ \vdots \\ x_n \end{bmatrix} = G_0 G_1 G_2 \ldots G_m \begin{bmatrix} b_1 \\ b_2 \\ \vdots \\ b_n \end{bmatrix}.$$

Next determine the Szegö polynomials $\_1(z), \_2(Z), \ldots, \_n(z)$ via the Levinson algorithm (see, e.g., Byrnes et al., A Complete Parameterization of All Positive Rational Extensions of a Covariance Sequence, supra, at 1843) and determine $g_o$ by the procedure of Appendix B applied to.

$$A(z) = \psi_n(z) + \chi_1 \psi_{n-1}(z) + \ldots + \chi_n.$$

Then, the polynomial $$A^0(z) = \sqrt{\frac{g_0}{c_0}} (\varphi_n(z) + x_1 \varphi_{n-1}(z) + \ldots + x_n)$$

can be used as an initial condition.

Finally, one could also use any of the pole estimates discussed in Markel et. al, *Linear Prediction of Speech*, supra, at 271–275, such as, for example, the one obtained via Prony's method. (Prony's method is not good enough for a final solution but could be used for an initial value.)

Excitation signal selection: The output of Box 5 is the choice of an excitation signal, drawn from a class of model signals, which when used to excite the LLN filter will best regenerate the observed signal. The design of the LLN filter is not a vocoder design, but rather a technology which can be used in a broad class of speech analysis and synthesis architectures. Various vocoder schemes employ various kinds of excitation signal selections schemes, based on a variety of classes of model signals. For example, for a pitch-excited vocoder, the excitation signal selection consist of a decision, for each speech frame, whether the sound is voiced or unvoiced, and for voiced frames, the determination of a pitch period. Pitch detection is standard in the art (see Barnwell III et al., *Speech Coding: A Computer Laboratory*

*Textbook,* supra, at 101 for discussion and further references). As another example for the CELP vocoder approach to analysis-by-synthesis, the excitation signal generator tests which signal from a code book of (typically) 1024 (or 10 bit) codewords produces a synthetic output which best matches the speech signal when passed through the LPC filter. Such selection procedures are standard in the art (see, e.g., Barnwell III et al., *Speech Coding: A Computer Laboratory Textbook,* supra, at 101 and 129–32; W. B. Kleijn, D. J. Krasinski and R. H. Ketchum, Fast Methods for the CELP Speech Coding Algorithm, IEEE Trans. Acoustics, Speech, and Signal Processing 38 (1990) at 1330–32; and TR45 Full-Rate Speech Codec Computability Standard PN-2972, Electronic Industries Association, 2001 Eye Street, N.W., Washington, D.C. 20006, 1990 at 22–32) when applied to LPC filters and can also be implemented for general digital filters, including, for example, LLN filters.

In summary, in the speech analyzer disclosed herein, any of these excitation signal selector would perform the same determination of the best signal, using an LLN filter in lieu of the use of an LPC filter.

The excitation generator: Just as various speech analysis schemes employ various kinds of excitation signal selection methodologies, for speech synthesis each vocoder employs an excitation generator based on its speech analysis methodology. In the speech synthesizer disclosed herein, any of these excitation generators would perform the same regeneration when interfaced with an LLN filter, in lieu of an LPC filter interconnection.

Figure 7:
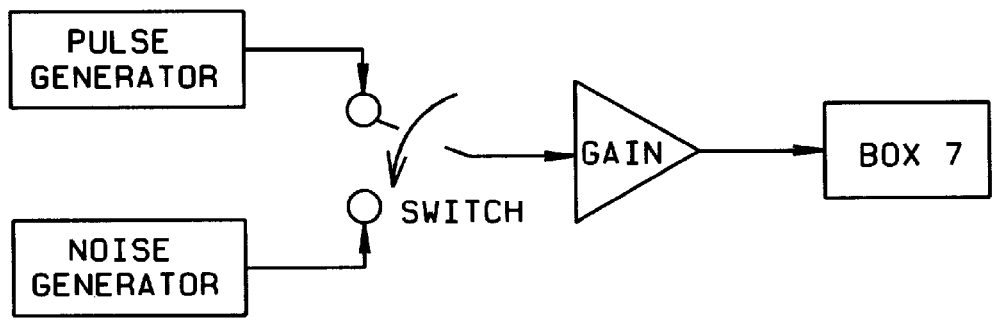
FIG. 7 is a schematic diagram of an excitation generator for a pitch-excited vocoder.

For the purposes of illustration, we describe the mechanisms of the excitation generator for an LLN filter employed in a pitch-excited vocoder. The pitch and voicing information of Box 5, the gain and the identification of the excitation signal selected in Box 5 are all coded and transmitted to the receiver where they are decoded and constitute the input to Box 6, as illustrated in FIG. 7.

Here there is a switch which is set to either voiced or unvoiced sound, according to the information obtained from Box 5. If the sound is voiced, a pulse train with the pitch period determined in Box 5 is produced, and, if the sound is unvoiced, white noise is produced. The signal thus produced is passed through a gain, the setting for which is obtained from Box 5, and delivered as an input to the LNN filter of Box 7. The purpose of the gain setting is to control the amplitude of excitation signal and thus the loudness of the synthetic speech (see, Barnwell III et al., *Speech Coding: A Computer Laboratory Textbook,* supra, at 87–88). The arrangement of these circuit elements, but not the design and implementation of the present invention, is standard in the art.

The LNN filter: The LLN parameters determined in Box are coded and transmitted to the receiver where they are decoded. The LNN filter of Box 7 is depicted in FIG. 4, where the parameters (2.5) are those transmitted from Box 3, and where the input is that produced in Box 6. The output of Box 7 is digital synthetic speech which may be transformed to an analogue speech signal by a D/A converter, after having gone through a de-emphasis filter, if needed.

Figure 8:
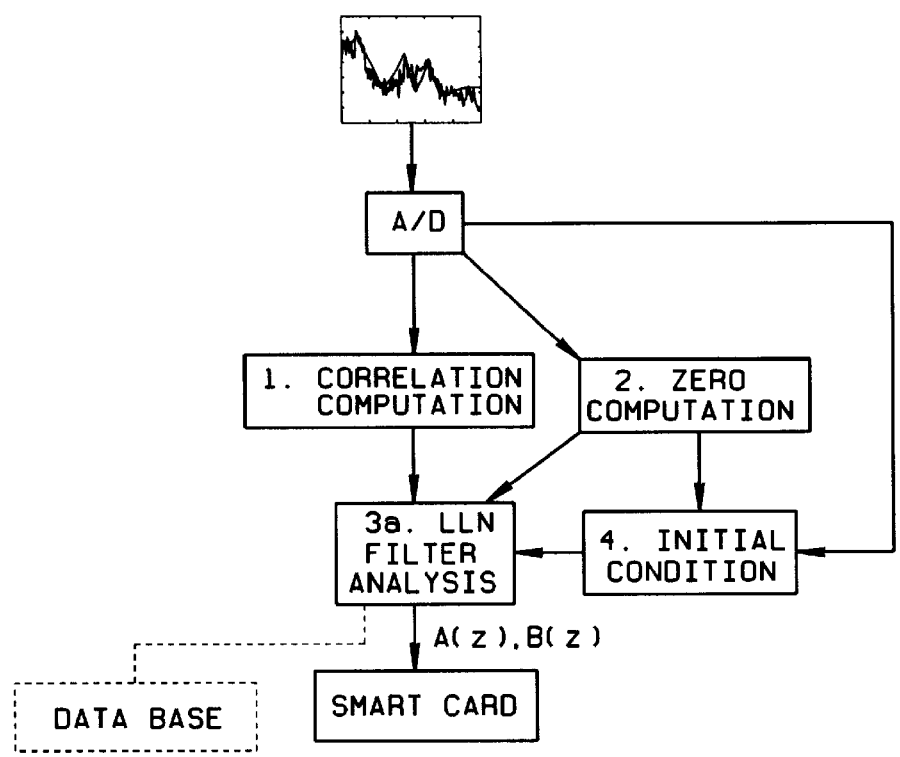
FIG. 8 is a schematic diagram of an apparatus for speaker enrollment for a speaker verification or for speaker identification.
Figure 9:
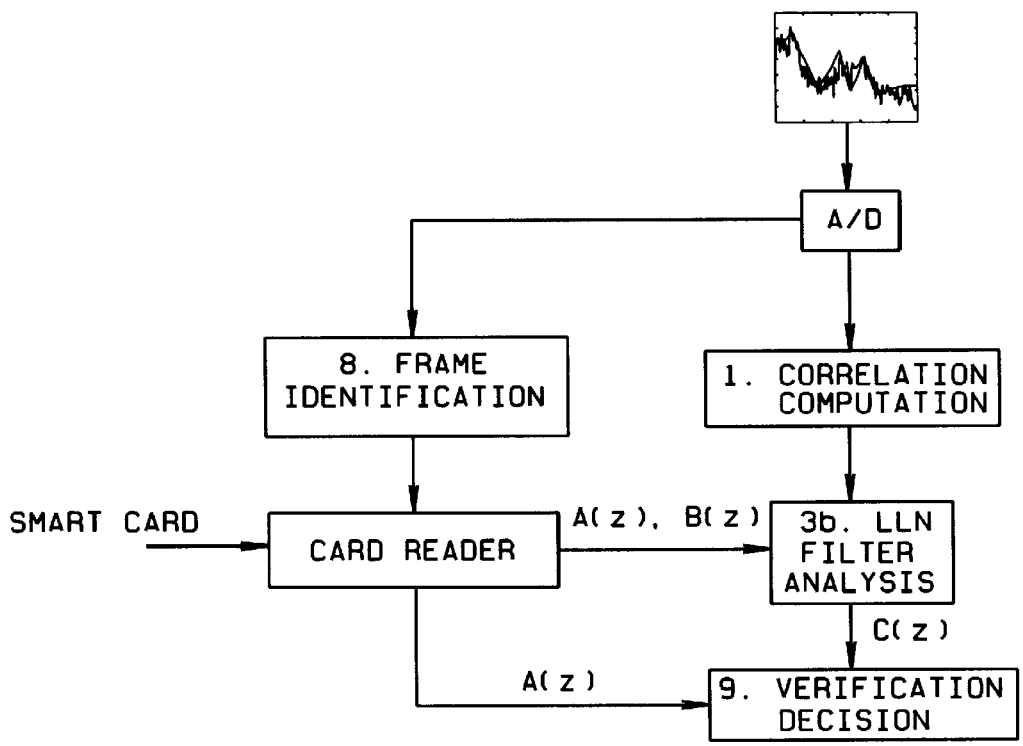
FIG. 9 is a schematic diagram of an apparatus for speaker verification.
Figure 10:
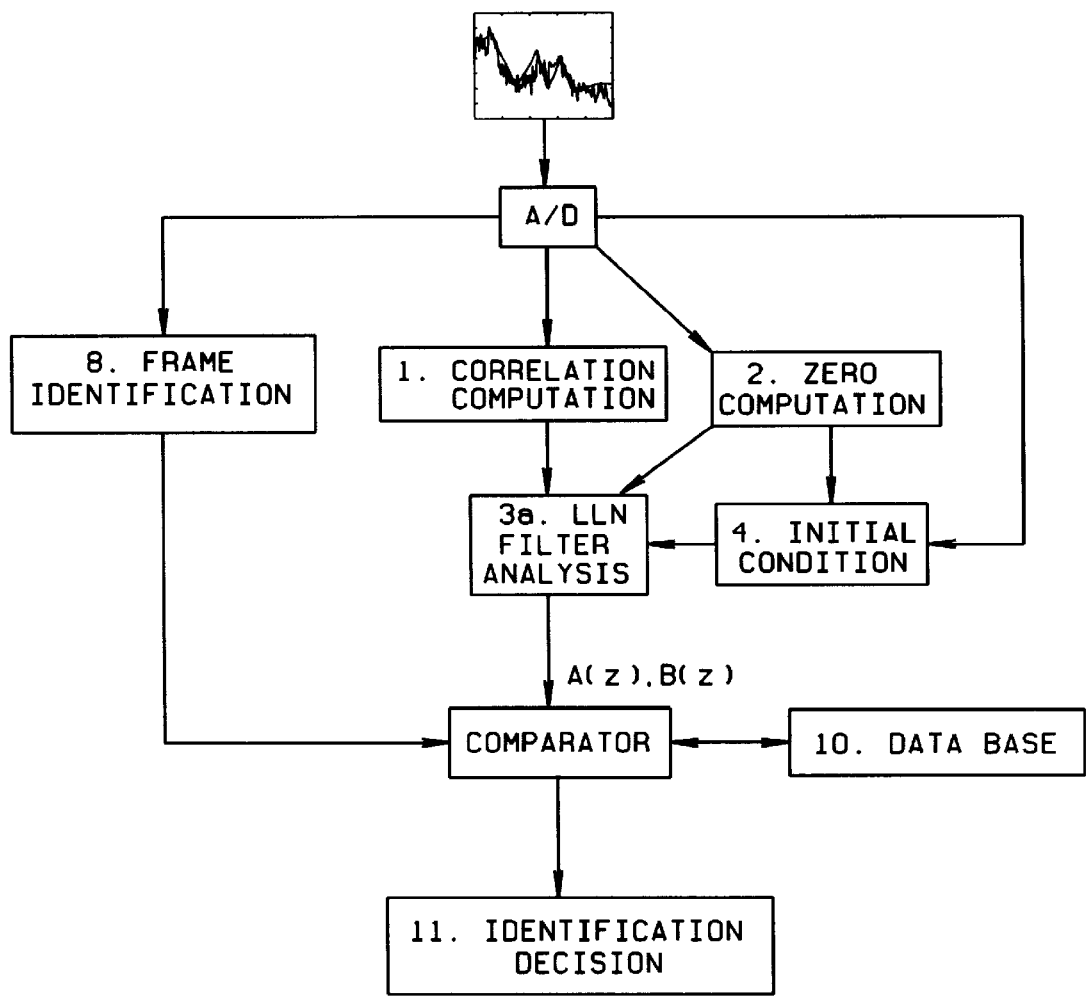
FIG. 10 is a schematic diagram of an apparatus for speaker identification.

FIGS. 8, 9 and 10 illustrate possible speaker enrollment, verification and identification environments of the invention and are modifications of the schematic diagram of a speech coder given in FIG. 5. FIG. 8 depicts an apparatus for enrollment. It works as the top (speech analysis and coding) part of the device depicted in FIG. 5. In particular, the analog/digital converter and boxes 1, 2 and 4 in FIG. 8 are identical to those embodied in FIG. 5 and described above. However, the excitation signal selection (Box 5) used in FIG. 5 is no longer needed. Also, Box 3 is modified to Box3*a,* which produces the coefficients of the corresponding zero polynomial B(z) and pole polynomial A(z), as disclosed above, rather than LLN gain parameters as in Box 3. An enrollment session in which certain code words are spoken by a person later to be identified produces via this apparatus a list of speech frames and their corresponding A(z) and B(z) polynomials. These triplets are stored, for example, on a smart card as is ordinary in the prior art using LPC filters, where a pair consisting of a list of frames and the corresponding pole polynomial is stored on a smart card. Alternatively, these triplets could be stored in a data base, as shown in FIG. 8.

FIG. 9 is a schematic illustrating the speaker verification environment of the invention. Automatic speaker recognition can further be divided into the use of text-dependent or text-independent methods. The distinction between these is that for text-dependent methods the same text or code words are spoken for enrollment and for recognition, whereas for text-independent methods the words spoken are not specified.

Depending on whether a text-dependent or text-independent method is used the pattern matching, the procedure of comparing the sequence of feature vectors with the corresponding one from the enrollment, is performed in different ways. The procedures for performing the pattern matching for text-dependent methods can be classified into template models and stochastic models. In a template model as the Dynamic Time Warping (DTW) (see e.g. H. Sakoe and S. Chiba, Dynamic Programming Algorithm Optimization for Spoken Word Recognition, IEEE Transactions on Acoustics, Speech and Signal Processing ASSP-26 (1978), 43–49) one assigns to each frame of speech to be tested a corresponding frame from the enrollment. In a stochastic model as the Hidden Markov Model (HMM) (see e.g. L. R. Rabiner and B. H. Juang, An Introduction to Hidden Markov Models, IEEE ASSP Magazine, January 1986, 4–16) a stochastic model is formed from the enrollment data, and the frames are paired in such a way as to maximize the probability that the feature sequence is generated by this model. For text-independent speaker recognition the procedure can be used in a similar manner for speech-recognition-based methods and text-prompted recognition (see e.g. S. Furui, Recent advances in Speaker Recognition, supra at P.241f) where the phonems can be identified. These pattern matching methods are standard procedures known in the art (see, J. P. Campbell Jr., Speaker Recognition: A tutorial, supra at 1452–1454).

The information encoded on the smart card (or equivalent) as disclosed above (see FIG. 8) is speaker specific. When the identity of the person in question needs to be verified, the person inserts his smart card in a card reader and speaks the code words into an apparatus as depicted in FIG. 9. Here, in Box 8, each frame of the speech is identified. This done by any of the pattern matching methods mentioned above and is standard in the art.

From the smart card the corresponding A(z) and B(z) are retrieved and transferred to Box3*b,* in which the same procedure as in Box3*a* is performed except that B(Z) is used as the zero polynomial and A(Z) as the initial condition. Box3*b* produces, as in FIG. 6 (but omitting the last box), a polynomial C(z) which is compared to A(z). The error, as measured by the coefficients of C(z)-A(z), from each frame is compounded in a measure of goodness-of-fit, as is standard in the prior art. Finally, a decision is made as to whether to accept or reject the identity of the person. This comparison and decision making is performed in Box 9. Verification decision. In order to enhance the level of security available in any implementation of the present invention, other techniques may be layered on. These include authenticating the smart card to minimize the use of fraudulent smart cards, randomizing and scripting the interrogation of the person seeking access to minimize the use of prerecorded voice substitutes, and other similar techniques as known in the art.

In speaker identification the enrollment is carried out in a similar fashion as for speaker verification except that the feature triplets are stored in a data base. As known in the art, a script would be used in either enrollment plan, in order to ensure that a prescribed confidence level of identification is achieved. However, the inventors anticipate that with the present invention the length of the script required for any particular confidence level would be reduced due to the ability to accurately reproduce unvoiced phonemes. FIG. 10 depicts an apparatus for speaker identification. It has similar components to the schematic in FIG. 8 except that there is a frame identification box (Box 8), precisely as in FIG. 9, which together with the zero and pole polynomials from Box3$a$ are fed into a comparator. The feature triplets are compared to the corresponding triplets for the population stored in the data base, whereas in FIG. 9 the feature triplet is compared to the feature triplet encoded on the smart card. In this application a matching score is given to each triplet in the data base, and on the basis of the (weighted) sum of the matching scores of each frame the identity of the speaker is decided.

As can be appreciated by those skilled in the art, the present invention may be readily implemented in a microprocessor(s) suitably programmed to perform the indicated calculations. Furthermore, references have been made above and throughout for all of the processing steps to existing software or programmable hardware to fully and completely implement the present invention. The present invention may also be implemented on custom designed chips, or otherwise using presently known design and implementation techniques for microelectronic circuitry for hardware or software implementation. As such, the present invention should not be limited to any particular hardware or software implementation and instead may be implemented in a variety of formats to suit the particular application thereof The foregoing disclosure has been provided as illustrative of the preferred embodiment as contemplated by the inventors and should not be considered as limiting. Instead, the scope of the invention should only be that as provided by the claims appended hereto, and their equivalents.

Appendix A. Foculazation Subroutine

A subroutine used repeatedly above is to find the stable polynomial (2.11) satisfying (2.12) for a given pseudo polynomial (2.9). This is a standard focalization problem for which there are many known procedures (see, e.g., F. L. Bauer, Ein direktes Iterationsverfahren zur Hurwitz-Zerlegung fines Polynoms, Arch. Elek. Ubertragung, 9 (1955), 285–290). We believe the method described in Vostr__, Zden_k, New Algorithm for Polynomial Spectral Focalization with Quadratic Convergence I, Kybemetika, 77 (1975), 411–418) is the best available art. We also disclose another factorization algorithm which also yields a positivity test. M-files software in MATLAB have been developed. This algorithm is recursive, using only ordinary arithmetic operations, and can be implemented with an MAC mathematics processing chip using ordinary skill in the art.

For the sake of briefness, the algorithm is described by referring to equations in Byrnes et al., A Complete Parameterization of All Positive Rational Extensions of a Covariance Sequence, supra. First solve the Levinson algorithm (equation 2.9 in the Byrnes et al. article) merely exchanging $c_0 c_1, \ldots, c_n$ for $q_0, q_1, \ldots, q_n$, thus obtaining the reflection coefficients, $\gamma_0, \gamma_1, \ldots, \gamma_{n-1}$ from (equation 2.7 in the Byrnes et al. article) and the Szegö polynomials $\psi_1(z)$, $\psi_2(Z), \ldots, \psi_n(Z)$ from (equation 2.9 in the Byrnes et al. article). Next, determine the coefficients $\alpha_1, \alpha_2, \ldots, \alpha_n$ such that $$\psi_n(z) + \alpha_1 \psi_{n-1} + \ldots + \alpha_n = z^n,$$

which amounts to solving a triangular linear system of equations. Using the vectors $\alpha$ and $\gamma$, with components $\alpha_1, \alpha_2, \ldots, \alpha_n$ and $\gamma_0, \gamma_1, \ldots, \gamma_{n-1}$ respectively as initial conditions, the fast algorithm (equation 2.17 in the Byrnes et al. article) converges to a limit as $t \to \infty$, provided the positivity condition (2.10) holds. In particular, $\alpha_k(t) \to \sigma_k$ for $k=1, 2, \ldots, n$. Then $$A(z) = a_0(z^n + \sigma_1 z^{n-1} + \ldots + \sigma_n), \quad (A.1)$$

where $$a_0 = \sqrt{\frac{d_0}{1 + \sigma_1^2 + \ldots + \sigma_n^2}} \quad (A.2)$$

is the required polynomial spectral factor. Moreover, setting $\gamma_k(t) = \gamma_{t+k}$, $$|\gamma_t| < 1 \text{ for } t = 0, 1, 2, \ldots \quad (A.3)$$

is a test for positivity, i.e., that (2.10) holds.

Appendix B. Covariance Computation Subroutine

This section describes how to determine the coefficients $g_0, g_1, \ldots, g_n$ in the expansion $$\frac{|B(e^{j\theta})|^2}{|A(e^{j\theta})|^2} = g_o + 2\sum_{k=1}^{\infty} g_k \cos(k\theta) \quad (B.1)$$

for any (stable) polynomials (2.6) and (2.11).

Begin by determining the coefficients $f_0, f_1, \ldots, f_{2n}$ in the expansion $$\frac{1}{|A(e^{j\theta})|^2} = f_0 + 2\sum_{k=1}^{\infty} f_k \cos(k\theta)$$

corresponding to a LPC filter. This is done by first applying the inverse Levinson algorithm (see B. Porat, *Digital Processing of Random Signals*, supra, at 165 and 47) to A(z) for computing the reflection coefficients, and then the inverse Schur algorithm (see, B. Porat, *Digital Processing of Random Signals*, supra, at 166) for computing $f_0, f_1, \ldots, f_{2n}$ and then the recursion $$f_{n+k} = -\sum_{i=0}^{k-1} \frac{a_i}{a_o} f_{n-i+1}$$

to find $f_{n+1}, f_{n+2}, \ldots, f_{2n}$. Finally, the coefficients $g_0, g_1, \ldots, g_n$ are obtained from $$g_j = p_0 f_j + \sum_{i=1}^{m} p_i(f_{|i-j|} + f_{i+j})$$

where $p_0, p_1, \ldots, p_n$ are the coefficients in $$B(z)B(z^{-1}) = p_0 + p_1(z+z^{-1}) + \ldots + p_n(z^n+z^{-n}).$$

Consequently, the covariance coefficients $g_0, g_1, \ldots, g_n$ can be computed using just recursive algorithms and ordinary arithmetic operations.

What is claimed is:

1. An enrollment device for enrolling a person into a speaker recognition system, said device including an LLN filter analyzer for converting said person's voiced speech into a set of LLN filter parameters, and a storage medium for storing said LLN filter parameters for later retrieval and comparison with voiced speech of any person seeking to access said speaker recognition system.

2. The enrollment device of claim 1 wherein the LLN filter analyzer comprises a converter for converting each frame of said person's voiced speech into a set of filter zeros and covariances, and a set of gains which match said filter zeros and covariances.

3. The enrollment device of claim 2 wherein the LLN filter analyzer further comprises a calculator for calculating a set of filter parameters from the filter zeros and filter covariances.

4. The enrollment device of claim 1 wherein said person's voiced speech is broken down into a plurality of frames having a predetermined order.

5. The enrollment device of claim 1 wherein said storage medium comprises a smart card.

6. The enrollment device of claim 1 wherein said storage medium comprises a data base.

7. A speaker recognition device comprising an LLN filter analyzer for analyzing a person's voiced speech and converting it into a set of LLN filter parameters, and a comparator for comparing at least one parameter from said voiced speech LLN filter parameters with at least one parameter from a previously determined set of LLN filter parameters to make a speaker verification or identification decision.

8. The speaker recognition device of claim 1 wherein said LLN filter analyzer further comprises a frame identifier for identifying an appropriate set of LLN filter parameters from amongst a set of stored LLN filter parameters for comparison.

9. The speaker recognition device of claim 1 wherein said previously determined set of LLN filter parameters are stored in a storage medium.

10. The speaker recognition device of claim 9 wherein said storage medium is physically dissociated from said speaker recognition device and further comprising an input device for accepting the dissociated storage medium and accessing the LLN filter parameters stored therein.

11. The speaker recognition device of claim 10 wherein said storage medium comprises a smart card.

12. The speaker recognition device of claim 9 wherein said storage medium comprises a memory device coupled to said comparator.

13. The speaker recognition device of claim 12 wherein said storage medium comprises a memory device in which is stored a plurality of LLN filter parameters associated with a plurality of persons.

14. The speaker recognition device of claim 7 wherein said person's voiced speech is broken down into a plurality of frames, and wherein the converter converts each frame of voiced speech into LLN filter parameters including at least A(z) and B(z).

15. The speaker recognition device of claim 14 wherein the previously determined LLN filter parameters include at least a frame of speech and its corresponding set of A(z) and B(z).

16. The speaker recognition device of claim 15 wherein said frames are substantially arranged in a predetermined order.

17. A speaker recognition device comprising a comparator for comparing at least one of a set of LLN filter parameters for a person's voiced speech with at least one of a stored set of previously determined voiced speech LLN filter parameters, and an analyzer for determining whether said LLN filter parameters have sufficiently matching patterns so as to be considered to be the same.

18. The speaker recognition device of claim 17 wherein said LLN filter parameters are correlated with individual frames of speech.

19. The speaker recognition device of claim 18 wherein LLN filter parameters are associated into a predetermined order so that the speaker is required to speak substantially an identical series of frames of speech as has been previously used to create the previously determined set of voiced speech LLN filter parameters in order to achieve a sufficiently matching pattern so as to be considered the same.

20. A method for recognizing a speaker comprising the steps of converting voiced speech into a set of LLN filter parameters, and comparing at least one parameter of said LLN filter parameters with at least one parameter of a previously stored set of LLN filter parameters.

21. The method of claim 20 further comprising the step of pattern matching said LLN filter parameters to determine if there is a match so as to verify the identity of the speaker.

22. The method of claim 21 further comprising the step of individually inputting a plurality of sets of stored LLN filter parameters prior to the comparison thereof with the voiced speech LLN filter parameters.

23. The method of claim 22 further comprising the step of accessing a data base in order to obtain the stored LLN filter parameters prior to comparison with the voiced speech LLN filter parameters.

24. The method of claim 23 further comprising the steps of associating the stored LLN filter parameters with a particular frame of speech in a particular order and using the order of frames to help determine which frames of voiced speech are to be matched with which stored frames.

25. A method for enrolling a person into a group of permitted enrollees of a speaker recognition system, said method comprising the steps of converting said persons voiced speech into a set of LLN filter parameters, and storing said set of LLN filter parameters into a storage medium for later retrieval and comparison.

26. The method claim 25 wherein said stored set of LLN filter parameters are comprised of coefficients of a zero polynomial and a polynomial, and further comprising the step of associating said coefficients of said stored set of LLN filter parameters with a particular frame of voiced speech.

27. The method of claim 26 further comprising the step of correlating the frames into a particular order for later comparison in that order.

* * * * *